July 31, 1928. Re. 17,052

E. M. CARROLL

SIDE ARCH BRICK

Original Filed March 22, 1923

Inventor

Edward M. Carroll.

by Emery, Booth, Janney & Varney his Attorneys

Reissued July 31, 1928. Re. 17,052

UNITED STATES PATENT OFFICE.

EDWARD M. CARROLL, OF SANFORD, FLORIDA, ASSIGNOR, BY DIRECT AND MESNE ASSIGNMENTS, TO CARROLL CORPORATION, OF ATLANTA, GEORGIA, A CORPORATION OF GEORGIA.

SIDE ARCH BRICK.

Original No. 1,487,146, dated March 18, 1924, Serial No. 626,902, filed March 22, 1923. Application for reissue filed August 20, 1925. Serial No. 51,531.

My invention aims to provide an improved side arch and brick therefor particularly adapted for use in locomotive fire boxes.

In the drawings, wherein I have shown an illustrative embodiment of my invention:

Referring more in detail to the drawings, I have there shown a conventional locomotive fire box presenting side sheets 1, and a plurality of arch tubes 2 for supporting my improved arch bricks which rest at one side on the side arch tubes and at the other side in contact with or closely adjacent to the side sheets so that the bricks bridge the space between the side sheets and the side arch tubes.

Figure 5:
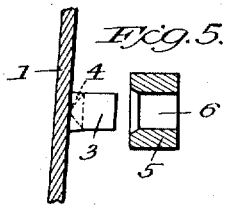
Fig. 5 is a detailed view partly in cross section, showing a supporting lug and washer designed for supporting the outer edge of the side arch bricks.

Herein I have shown a plurality of lugs 3 (see Fig. 5), one for each brick, and these lugs are preferably welded to the side sheets in a plane containing the axes of the tubes. Before they are applied, they are preferably pointed or cone-shaped as at 4 and butt-welded to the side sheets by means of what is commonly known as a fillet electrical weld.

Herein I have shown means to protect the supporting lugs against the action of the radiant heat in the fire box and also to provide adequate supporting surfaces for my bricks. To these ends I have shown oblong washers 5 (Fig. 5), each made of cast iron or some refractory material and having a perforation 6 to receive the lug, and these washers are conveniently made of a thickness equal to the length of the lugs.

Figure 1:
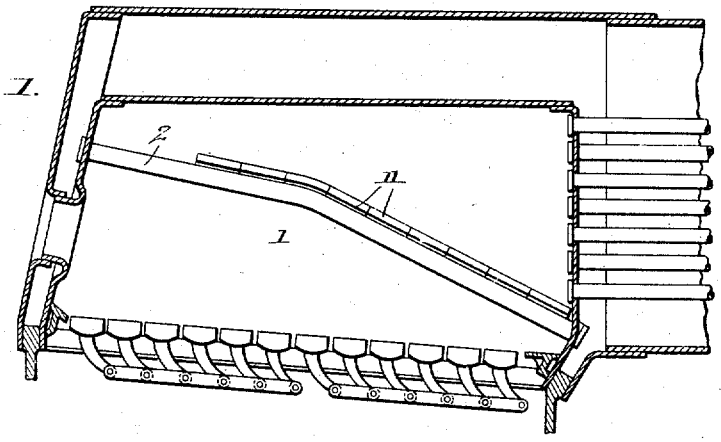
Fig. 1 is a view partly in section showing a portion of a locomotive fire box equipped with an arch embodying my improved side arch construction.
Figure 2:
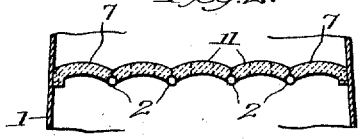
Fig. 2 is a fragmentary cross sectional view of the arch taken on the line 2—2 of Fig. 1.

As illustrated, herein my improved side bricks are generally rectangular in form and have arcuate body portions 7 of approximately uniform thickness which are curved substantially throughout their width on the upper and lower surfaces whereby to present flame channels between the side sheets and the side arch tubes (Fig. 2). This shape also enables a greater portion of the side arch tubes to be exposed to the direct action of the furnace heat and provides adequate strength with a minimum of material.

Figure 3:
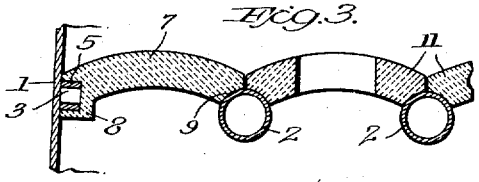
Fig. 3 is a fragmentary cross sectional view taken on the line 3—3 of Fig. 1, drawn to a larger scale.
Figure 4:
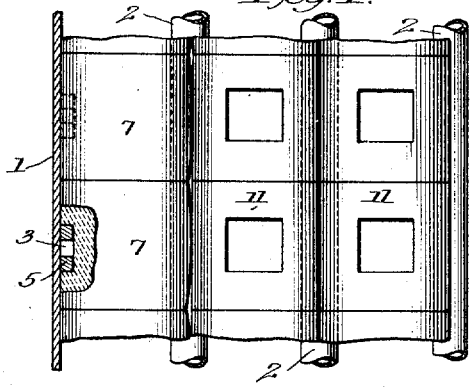
Fig. 4 is a fragmentary top plan view, partly in cross section, of a portion of the arch shown in Fig. 1.

At the side sheet sides of my side bricks (see Fig. 3), I have shown thickened portions, herein in the form of flanges 8 so that the side sheet edges are relatively wide and flat being approximately at right angles to the body portions of the bricks and arranged to hug closely against the side sheets throughout their areas. These thick side edges have provision for supporting them on the lugs 3, while the opposite sides are undercut forming channels or grooves 9 to fit against the side arch tubes and normally wedge them toward the side sheets.

At the thickened sides of each of the bricks I provide a recess 10, preferably midway of its length, adapted to receive the washer 5. This recess has a shoulder at its upper side to support the weight of the brick on the upper surface of the washer. This provides for distributing the weight of the brick over a much larger surface than the lugs present and prevents breakage incident to shocks and jars of the locomotive. As illustrated, the recess 10 is arranged between the upper and lower edges of the brick more adequately to protect the lugs and washers from the action of the radiant heat in the fire box.

Figure 6:
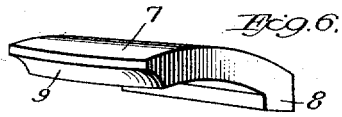
Figs. 6 and 7 are perspective views taken from different angles of the form of arch bricks illustrated in Figs. 1 to 4.
Figure 7:
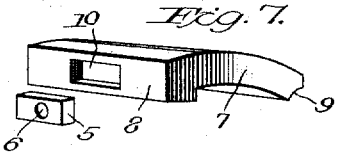
Figure 8:
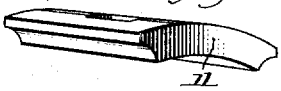
Fig. 8 is a perspective view of one form of center arch brick suitable for use with my side arch bricks; and, Fig. 9 is a perspective view taken from one end of one of my side arch bricks.
Figure 9:
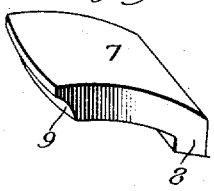

Referring to Figs. 6 and 9 I have there shown the tube engaging sides of my bricks as being arcuate throughout; that is, the tube engaging channels 9 are not only curved in cross section to correspond with the curvature of the tubes but are also curved throughout their lengths and the edges of the bricks above the undercut channels are correspondingly curved so as to permit the bricks to adapt themselves to bent tubes and be supported thereon at one point. Moreover, this shape permits one side brick to be used either as a "left" or as a "right" in that portion of the locomotive fire box wherein the side arch tubes are not in parallelism with the side sheets. Thus, corresponding right and left side bricks may be made identical to avoid the necessity for making two specially shaped bricks, one for a right and the other for a left.

I have here shown center arch bricks 11 which are similar, in some respects, to those shown in my prior patent dated August 13, 1918, No. 1,275,386; but my improved side arch bricks are adapted for use with many other forms of center arch bricks, and vice versa.

The installation of my improved side bricks in an ordinary locomotive fire box simply calls for the welding of the lugs in proper position on the side sheets and the provision of suitable washers to support the bricks in the same horizontal plane as are the center arch bricks so that there will be no tendency for them to wedge against the tubes out of their proper position. They are placed with their end edges in contact so that one helps to support the other against rocking movement after they adapt themselves to the tubes with their thickened straight side edges either contacting with the side sheets 1 or lying closely adjacent thereto. Thus it is apparent that an arch embodying my invention may quickly and readily be installed and replacements or repairs may easily be made.

Obviously, my invention is susceptible of various changes to adapt it to different types of fire boxes.

Having thus described my invention, what I claim and desire to secure by Letters Patent is:

1. A side brick for locomotive arches, curved throughout its upper surface and curved substantially throughout its lower surface, the brick being provided with a depending flange on one side, which flange is at right angles to the body of the brick, the outer surface of this flange being flat to form a relatively wide contacting area, and this flange being provided with a depression to receive a supporting means, and the opposite side of the brick being undercut to form a supporting ledge.

2. A side brick for locomotive arches, one side of the brick being provided with a downwardly extending flange which flange is substantially at right angles to the body of the brick, thereby forming a flat side, the depth of which is greater than the mean thickness of the body of the brick, said flange being provided with a depression in its face at a point between the lower and upper extremities thereof, and the opposite side of the brick being undercut to form a supporting ledge.

3. A side brick for locomotive arches, curved throughout its upper surface and provided with a downwardly depending flange on its one side, the depth of the flange being greater than the mean thickness of the body portion of the brick, and the lower surface of the brick being arcuate and merging into said flange, the said flange being provided on its outer surface with a depression for the reception of the supporting means, and the said flange being arranged perpendicularly with the body of the brick, the opposite side of the brick having an undercut portion extending throughout its length to form a supporting ledge.

4. In combination with a locomotive side sheet having lugs welded thereon, washers fitting over said lugs, a plurality of arch tubes, arcuate side bricks, said bricks having a perpendicularly arranged flange at their one side, the depth of which is greater than the mean thickness of the brick, said flange provided with a depression formed therein to receive said washers, the opposite side of each brick being provided with an undercut portion to rest on said tube.

5. A side arch brick for locomotive arches having a recess at one side for resting on and receiving a support projecting from the side sheet, and presenting an under-cut tube engaging channel at the other side to conform to the curvature of the tube, said channelled side being curved from one end edge of the brick to the other whereby said brick may be used interchangeably at the right or or left hand side of the arch and be supported in a substantially horizontal position.

In testimony whereof, I have signed my name to this specification.

EDWARD M. CARROLL.